(12) United States Patent
Shirai et al.

(10) Patent No.: US 6,229,607 B1
(45) Date of Patent: May 8, 2001

(54) FINE MOVEMENT MECHANISM UNIT AND SCANNING PROBE MICROSCOPE

(75) Inventors: Takashi Shirai, Tsukuba; Ken Murayama, Tsuchiura; Takafumi Morimoto, Kashiwa; Hiroshi Kuroda, Tsuchiura; Harumasa Onozato, Ohme, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/182,048

(22) Filed: Oct. 29, 1998

(30) Foreign Application Priority Data

Oct. 31, 1997 (JP) ................................................ 9-316035

(51) Int. Cl.[7] ............................. G01B 11/14; G01B 5/28; G01N 23/00
(52) U.S. Cl. ............................. 356/375; 250/306; 73/105
(58) Field of Search .......................... 356/375; 250/306, 250/307, 423 F; 73/105; 318/630, 632, 640

(56) References Cited

U.S. PATENT DOCUMENTS

| 4,667,415 | 5/1987 | Barsky . |
| 5,051,594 | 9/1991 | Tsuda et al. . |
| 5,245,863 | 9/1993 | Kajimura et al. . |
| 5,406,833 | 4/1995 | Yamamoto . |
| 5,408,094 | 4/1995 | Kajimura . |
| 5,656,769 | * 8/1997 | Nakano et al. ........................ 73/105 |
| 5,679,952 | * 10/1997 | Lutwyche et al. .................... 250/306 |

FOREIGN PATENT DOCUMENTS

| 0 149 017 | 7/1985 | (EP) . |
| 0 499 149 | 8/1992 | (EP) . |
| 0 594 362 | 4/1994 | (EP) . |
| 08278317 | 10/1996 | (EP) . |
| 6-082249 | 3/1994 | (JP) . |
| 8-278317 | 10/1996 | (JP) . |

OTHER PUBLICATIONS

Application Magnetism Society of Japan, vol. 16, No. 3, 1992, Evaluation on electronic and magnetic materials by using STM/AFM/MFM and its applications, S. Hosaka, pp. 511–518.
Autumn Academic Lecture Meeting of Precision Technology Society, 1992, "Force microscope of optical lever system with AFM and MFM functions", pp. 277–278.
Applied Physics Letters, vol. 61, No. 21, "Magnetic Force Microscope Using a Direct Resonance Frequency Sensor Operating in Air", A. Kikukawa et al, pp. 2607–2609.

* cited by examiner

Primary Examiner—Frank G. Font
Assistant Examiner—Roy M. Punnoose
(74) Attorney, Agent, or Firm—Mattingly, Stanger & Malur, P.C.

(57) ABSTRACT

A fine movement mechanism unit is configured by a supporting member, two fixed sections fixed to this supporting member, two pairs of parallel-plate flexural sections disposed between the two fixed sections, an X fine movement mechanism, a Y fine movement mechanism, and a Z fine movement mechanism. The X fine movement mechanism has an X moving section movable in an X direction, connected to each of the two fixed sections through the two pairs of parallel-plate flexural sections, and two X direction piezoelectric actuators causing the X moving section to move. The Y fine movement mechanism arranged to the X moving section, has other two pairs of parallel-plate flexural sections, a Y moving section movable in the Y direction, connected to the X moving section through the other two pairs of parallel-plate flexural sections, and two Y direction piezoelectric actuators causing the Y moving section to move relatively to the X moving section. The Z fine movement mechanism arranged to the Y moving section, has a Z moving section movable in a Z direction perpendicular to both of the X and Y directions, and a Z direction piezoelectric actuator causing the Z moving section to move.

5 Claims, 15 Drawing Sheets

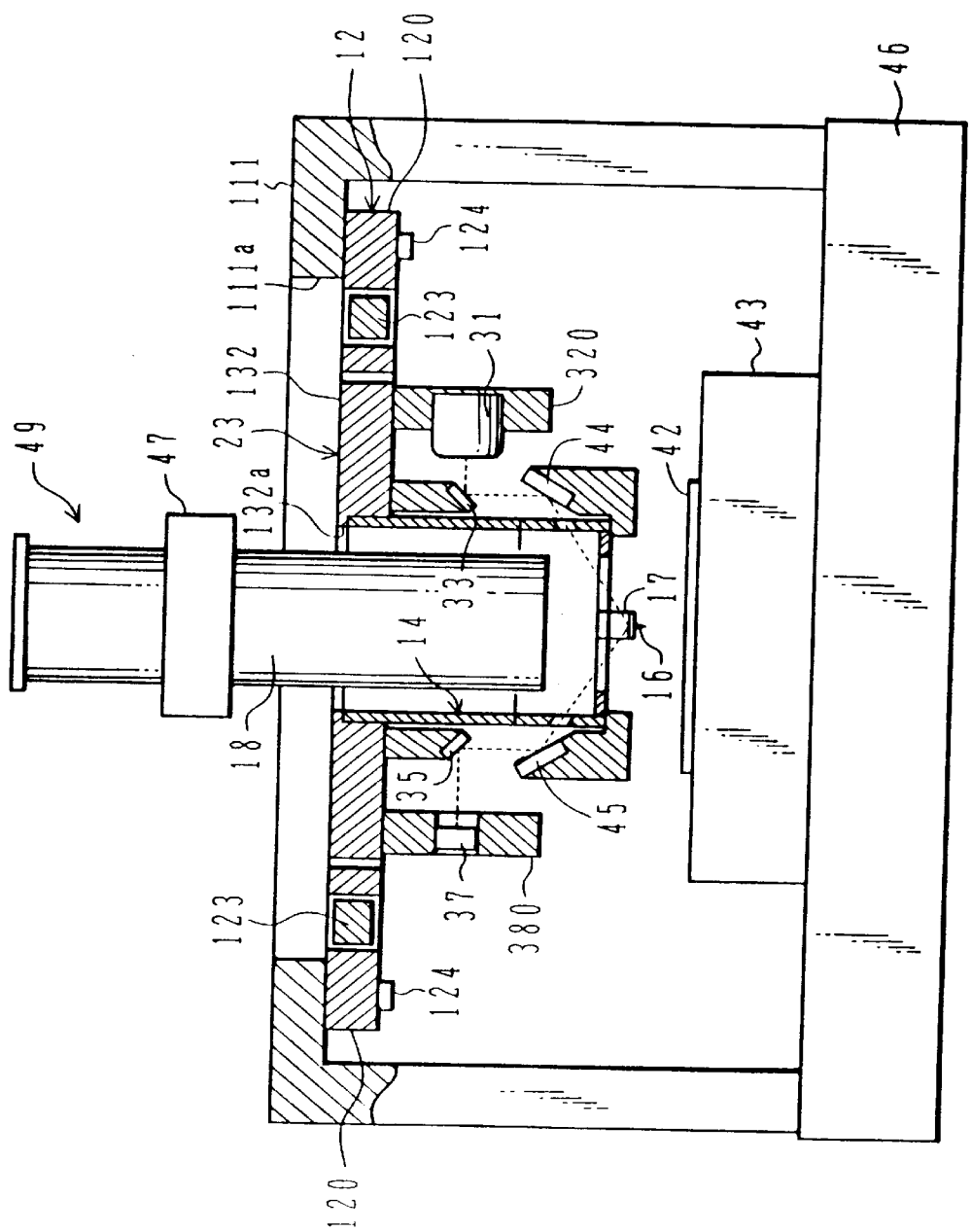

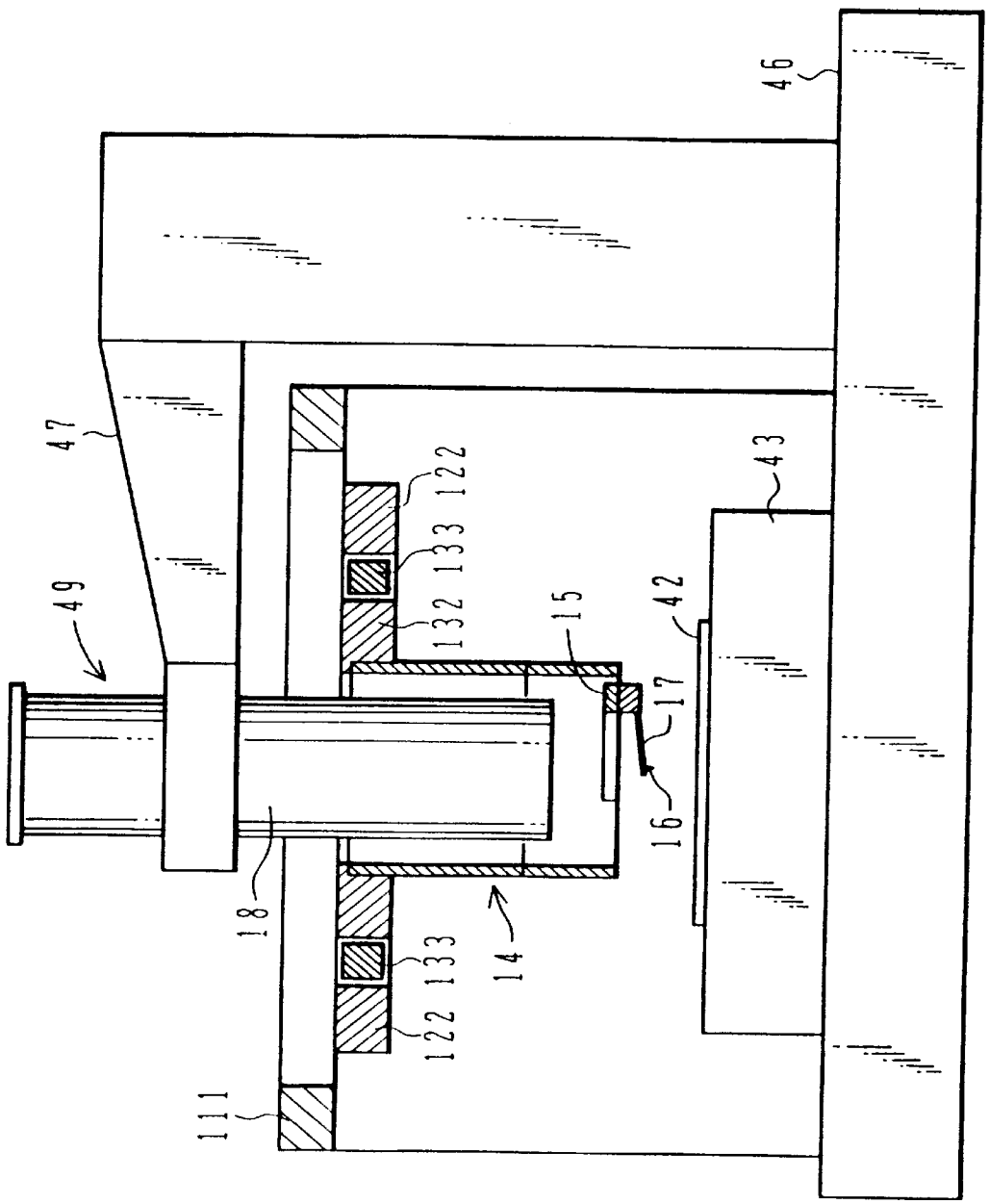

FINE MOVEMENT MECHANISM UNIT AND SCANNING PROBE MICROSCOPE

BACKGROUND OF THE INVENTION

1. Field of the Invention

The present invention relates to a fine movement mechanism unit and a scanning probe microscope, and more particularly, to a fine movement mechanism unit suitable for measuring a large-sized sample by moving a section including a cantilever when observing the sample, and a scanning probe microscope provided with the fine movement mechanism unit, in which a spot to be measured can be observed by an optical microscope or an electron microscope and the like in advance and the spot is measured by detecting flexural deformation (bending) of the cantilever by means of an optical detecting system.

2. Description of the Related Art

As literatures on the conventional scanning probe microscope (SPM), for example, two literatures such as "Evaluation on electronic and magnetic materials by using STM/AFM/MFM and its applications", Journal Vol.16, No.3, 1992 (511 page) of Application Magnetism Society of Japan, and "Force microscope of optical lever system with AFM and MFM functions", Papers (277 page) in Autumn Academic Lecture Meeting of Precision Technology Society, 1992, can be cited. As described in the literatures, a "SPM" means a general term as to a scanning tunnel microscope (STM), an atomic force microscope (AFM) and a magnetic force microscope (MFM) and the like. The SPM operates to obtain information as to a surface structure or a leakage magnetic distribution on a sample by making use of a tunnel current, an atomic force and a pressing force (hereinafter these are called "mutual operative force" as a general term) which are generated by approaching extremely or touching a solid probe tip to the sample. The resolution of the SPM is higher than that of the microscopes with an optical lens system by one figure or two figures.

The above-mentioned SPM has the probe tip arranged to be directed to the sample when carrying out measurement. The shapes of the probe tip are various and a shape like a rod or a pole, a cone, a prism, or a beak is used in response to objects to be measured by the SPM.

Further, as a concrete example of the SPM, there is a probe-tip movement type atomic force microscope which is configured so that the part including a cantilever with the probe tip can be moved when measuring the sample by the probe tip. As literatures on the atomic force microscope of the probe-tip movement type, JP-A-6-82249 and JP-A-8-278317 can be cited, for example.

The atomic force microscope described in JP-A-6-82249 has a configuration that the part including a spring element (equivalent to the cantilever) with a detecting tip (equivalent the probe tip) at its point and an optical detecting system relevant to the spring element are movable by a fine movement mechanism and the part including the sample stands still. This configuration enables the atomic force microscope to measure a large-sized sample or a heavy sample.

The atomic force microscope described in JP-A-8-278317 is equipped with two layered-piezoelectric-element rods arranged respectively in an X-axis direction and a Y-axis direction so as to connect their pointed ends, and a cantilever with a probe tip, which is attached to the connected part of the two pointed ends through a Z-axis direction piezoelectric actuating member. Further, this atomic force microscope has an optical detecting system in which optical routes are formed by using optical route converting members so that the flexural deformation (bending) of the cantilever can be sure to be detected optically even if the position of the probe tip is changed in the X-axis and Y-axis directions based on the expansion and contraction of the respective piezoelectric-element rods for the X-axis and Y-axis directions. In addition, an open space is formed above the cantilever so that the optical detecting system can be placed at an optional position in the upper region above the cantilever. In accordance with the structure, even if the probe tip is relatively moved in relation to the sample, a ray of light from a light source always strikes the same spot on the rear of the cantilever and further strikes the same point on a light receiving surface of a light receiving element after the reflection on the rear of the cantilever.

The above-mentioned first conventional atomic force microscope is capable of measuring a large-sized sample by moving the part including the probe tip by means of the fine movement mechanism. However, the structure of the first conventional microscope poses a problem that an optical microscope used for observing the place to be measured can not be added, since the members forming the optical detecting system are arranged above the cantilever. On the other hand, the second conventional atomic force microscope does not pose the above problem. However, since the piezoelectric actuating member used for the X direction (corresponding to an X fine movement mechanism) and the piezoelectric actuating member used for the Y direction (corresponding to a Y fine movement mechanism) are fixed to the body of the microscope through a block member and a hinge member, when performing scanning operation in an XY rectangular coordinates system, an interference effect happens between X and Y movements and therefore it poses another problem that independent precise motions in each of the X and Y directions cannot be generated.

SUMMARY OF THE INVENTION

The object of the present invention is to provide a fine movement mechanism unit suitable for measuring large-sized samples, which is capable of reducing a load of a fine movement mechanism when performing the measurement, and performing displacement movement exactly and independently in respective scanning actions in the X and Y directions, and further improving the movement characteristics of the scanning in a rectangular coordinates system.

Another object of the present invention is to provide a fine movement mechanism unit capable of ensuring a space used for arranging other different microscopes (an optical microscope, an electron microscope and the like) observing a part to be measured including a cantilever from an upper side.

Another object of the present invention is to provide a scanning probe microscope configured to detect flexural deformation of the cantilever by means of an optical detecting system being capable of causing a ray of light to strike the same spot in the rear of the cantilever by means of the above-mentioned fine movement mechanism unit even if the cantilever moves freely toward any direction of the X-axis, Y-axis and Z-axis.

Another object of the present invention is to provide a complex scanning probe microscope configured to include the fine movement mechanism unit of the present invention, which is capable of observing a pointed end of a probe tip by means of other optical microscopes and the like.

The fine movement mechanism unit and the scanning probe microscope in accordance with the present invention are configured as follows in order to attain the objects.

The fine movement mechanism unit is configured by a supporting member; an X fine movement mechanism having two fixed sections fixed to the supporting member, at least two pairs of parallel-plate flexural sections disposed between the two fixed sections, an X moving section movable in an X direction, which is connected to each of the two fixed sections through each of the two pairs of parallel-plate flexural sections, and two X direction piezoelectric actuators causing the X moving section to move relatively to the fixed sections, each of which is arranged between two parallel plates in each of the two pairs of parallel-plate flexural sections; a Y fine movement mechanism arranged to the X moving section, having other at least two pairs of parallel-plate flexural sections, two parallel plates in each pair of which are arranged in a Y direction perpendicular to the X direction, a Y moving section movable in the Y direction, which is connected to the X moving section through the other two pairs of parallel-plate flexural sections, and two Y direction piezoelectric actuators causing the Y moving section to move relatively to the X moving section, each of which is arranged between two parallel plates in each of the other two pairs of parallel-plate flexural sections; and a Z fine movement mechanism arranged to the Y moving section, having a Z moving section movable in a Z direction perpendicular to both of the X and Y directions, and a Z direction piezoelectric actuator causing the Z moving section to move.

In accordance with the configuration, a wide space can be ensured in the region facing the sample and the large-sized samples can be measured without difficulties. Also, since the fine movement mechanism is separated into the X fine movement mechanism and the Y fine movement mechanism so as to be able to perform X and Y movements independently, the load of the fine movement mechanism operating to follow the surface shape of the sample, and the movement characteristics of the scanning in the X and Y directions can be improved.

In the above-mentioned configuration, preferably, the X, Y and Z fine movement mechanisms have respectively openings which make a through space toward the Z direction, and an observation unit can be arranged upward by utilizing the through space. In this case, it is preferable to use a tube-type piezoelectric element as the Z direction piezoelectric actuator.

The scanning probe microscope is provided with a cantilever having a probe tip at its end, an X fine movement mechanism for moving the cantilever and the probe tip in the X direction when performing measurement, a Y fine movement mechanism for moving the cantilever in the Y direction perpendicular to the X direction, a Z fine movement mechanism for approaching or separating the cantilever in the Z direction perpendicular to both of the X and Y directions, a supporting member for supporting each of the X, Y and Z fine movement mechanisms, and an optical detecting unit for detecting a flexural deformation (bending) amount of the cantilever when it bends based on a change of the mutual operative force between the probe tip and a sample. As the X, Y and Z fine movement mechanisms, the above-mentioned fine movement mechanism unit is used. When performing the measurement, the probe tip is directed to the sample on a sample stand with a predetermined separation, and the optical detecting unit includes a light source and a photodetector, and is further configured so that a ray of light emitted from the light source enters the photodetector based on the reflection on the rear of the cantilever. The cantilever, the first reflecting section for reflecting the ray of light from the light source and guiding it to the rear of the cantilever, and the second reflecting section for reflecting the ray of light from the rear of the cantilever and guiding to the photodetector are fixed to the Z fine movement mechanism. At the measurement, if the flexural deformation amount of the cantilever is kept to be regular when the probe tip moves, the ray of light is guided to an identical spot on the rear of the cantilever and further to an identical point on the photodetector.

In accordance with the above-mentioned scanning probe microscope, since the optical detecting unit has the above-mentioned structure, even if the cantilever moves finely any direction of the X, Y and Z directions, the relative positional relationship between each of the components of the optical detecting unit and the reflecting surface on the rear of the cantilever is not changed and therefore the light striking spot on the rear of the cantilever is regular. For example, if the Z fine movement mechanism operates to do fine movement in the Z direction, though the distance between the light source and the first reflecting section and the distance between the photodetector and the second reflecting section is changed, the position of the ray of light incident on the cantilever is not changed because an angle of incidence in the first reflecting section is changeless, and further as long as the flexural deformation of the cantilever is constant, the incident point on the light receiving surface of the photodetector exists at the same position. This matter is identical as to the fine movement in the X and Y directions. Accordingly, if the probe tip moves finely toward three-axes directions of X, Y and Z mutually crossing at right angles relative to the sample, a light striking spot on the cantilever and a light entering spot on the light receiving surface of the photodetector can be kept to be regular under the condition that the bending amount of the cantilever is always the same value.

Another scanning probe microscope is, in the above-mentioned configuration, preferably configured so that the optical detecting unit has the third reflecting section for reflecting the ray of light irradiated from the light source in the moving direction of the Y fine movement mechanism toward the moving direction of the Z fine movement mechanism and further guiding it to the first reflecting section, and the fourth reflecting section for reflecting the ray of light from the second reflecting section toward the moving direction of the Y fine movement mechanism to enter the photodetector arranged to the Y moving section. The third and fourth reflecting sections are fixed to the Y moving section of the Y fine movement mechanism. Thereby, even if the probe tip moves finely in the three-axes directions of the X, Y and Z directions mutually crossing at right angles relative to the sample, a light striking spot on the cantilever and a light entering spot on the light receiving surface of the photodetector can be kept to be regular under the condition that the flexural deformation amount of the cantilever is the same value.

Another scanning probe microscope is, in the above-mentioned configuration, preferably configured so that the light source and the photodetector of the optical detecting unit are fixed to the X moving section of the X fine movement mechanism, and the light source emits the ray of light and also the photodetector receives it in the Y direction, and further the ray of light emitted from the light source is guided to the photodetector through a series of the third reflecting section arranged to the Y moving section, the first reflecting section arranged to the Z fine movement mechanism, the rear of the cantilever, the second reflecting section, and the fourth reflecting section arranged to the Y moving section. Accordingly, even if the probe tip moves finely in the three-axes directions of the X, Y and Z directions mutually crossing at right angles relative to the sample, a light striking spot on the cantilever and a light entering spot on the light receiving surface of the photodetector can be kept to be regular under the condition that the flexural deformation amount of the cantilever is the same value.

Another scanning probe microscope is, in each of the above-mentioned configurations, preferably configured so that the X, Y and Z fine movement mechanisms have openings respectively, which form a space to go through in the Z direction and are used for placing another observation unit from an upper position. Therefore, the space used for arranging another observation unit can be ensured easily and thereby the part to be measured including the probe tip and the like in the scanning probe microscope can be observed widely.

Another scanning probe microscope is, in the above-mentioned configuration, configured so that the supporting member for supporting the fine movement mechanisms and a supporting frame for supporting the observation unit such as an optical microscope are fixed to a supporting base, and an object lens of the optical microscope and the like fixed to the frame is placed in the space formed by the openings of the fine movement mechanisms. Therefore, the part including the cantilever can be measured widely by the optical microscope and the large-shaped samples can be measured without difficulties.

BRIEF DESCRIPTION OF THE DRAWINGS

FIG. 14 is a view showing the fourth embodiment of the scanning probe microscope of the present invention, in which main sections are shown in a cross sectional view.

FIG. 15 is a side view taken by seeing the fourth embodiment shown in FIG. 14 from a right side, in which parts are shown as a cross sectional view by cutting along the X direction.

DESCRIPTION OF THE PREFERRED EMBODIMENTS

Hereinafter, preferred embodiments of the present invention will be described with reference to the accompanying drawings.

Figure 1:
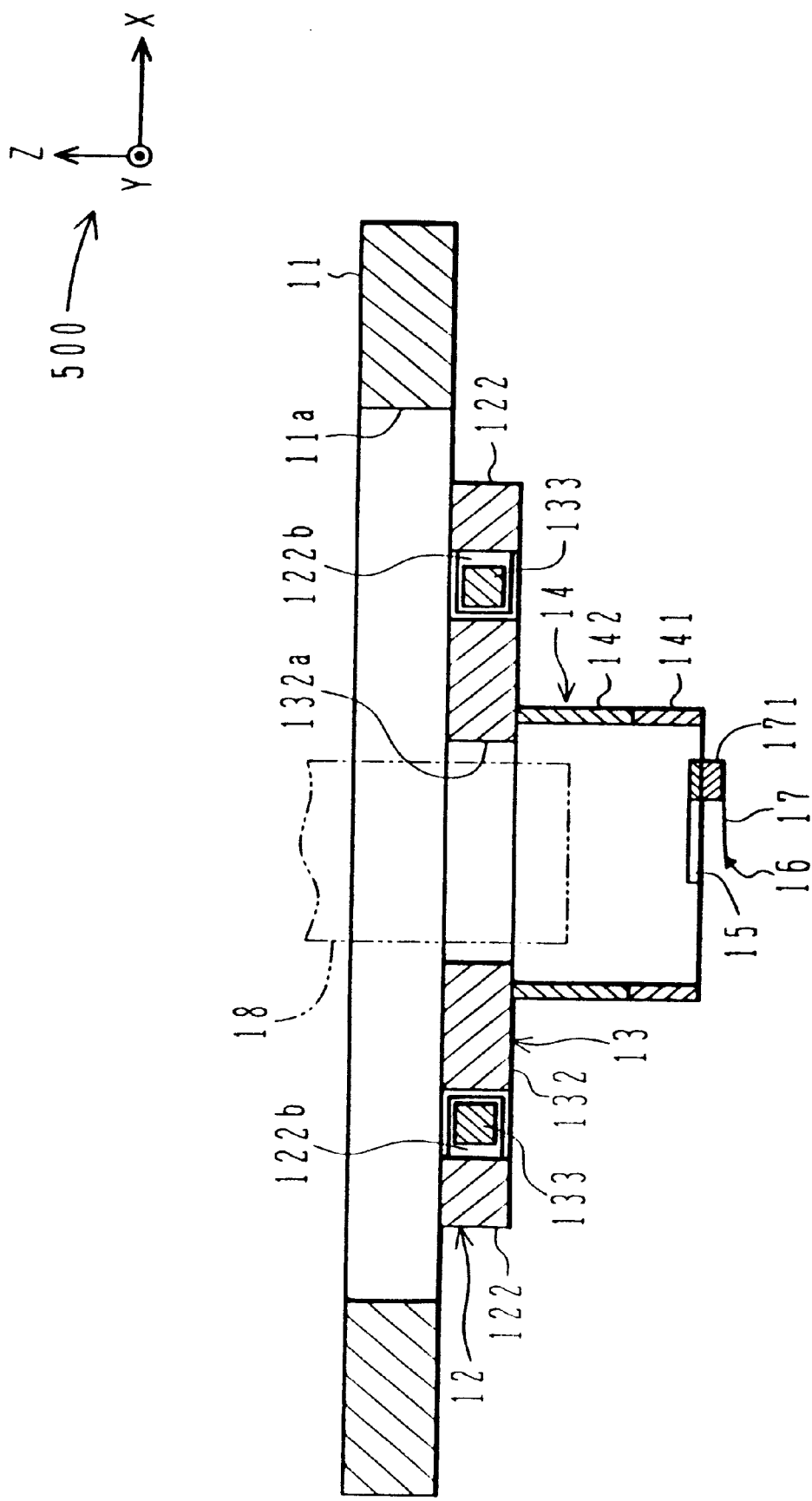
FIG. 1 is a longitudinal sectional view of the first embodiment of the fine movement mechanism unit of the present invention.
Figure 2:
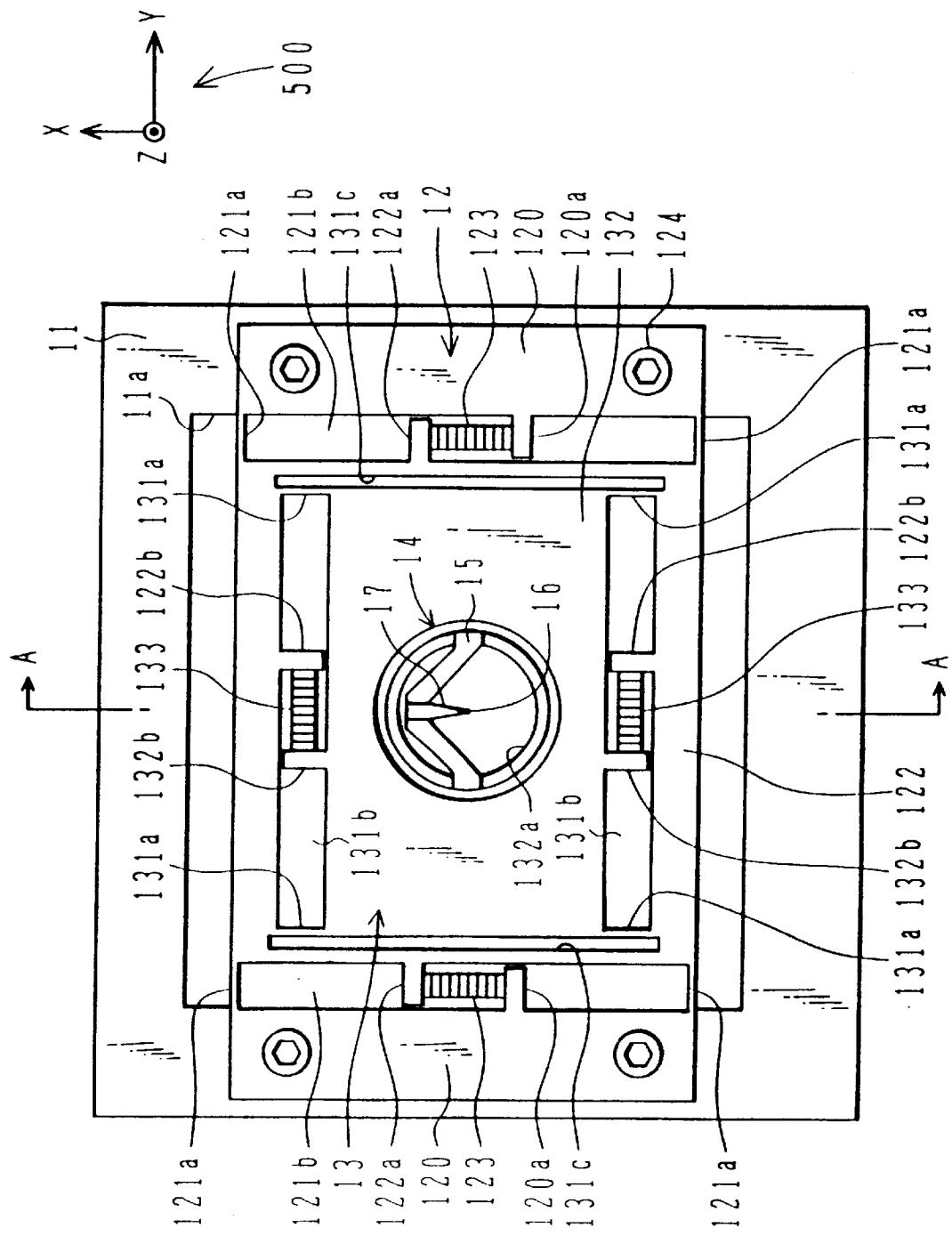
FIG. 2 is a bottom view taken by seeing the fine movement mechanism unit shown in FIG. 1 from a lower side.

The first embodiment of a fine movement mechanism unit will be explained with reference to FIGS. 1–3. FIG. 1 shows a sectional view (A—A line sectional view in FIG. 2) obtained by cutting the fine movement mechanism unit along an X-axis direction and FIG. 2 shows a bottom view obtained by seeing it from a lower side in FIG. 1. In these figures, an X fine movement mechanism 12 is fixed to a supporting member 11 forming a part of a unit frame. The supporting member 11 is a plate-shaped member and has, for example, a rectangular opening (space) 11a in the center part thereof. The X fine movement mechanism 12 also has a platelike shape. Further, a Y fine movement mechanism 13 is integrated into a plate-shaped body including the X fine movement mechanism 12 in a body so as to be surrounded by the parts forming the X fine movement mechanism 12. In the Y fine movement mechanism 13, a circular opening (space) 132a is formed in the center of a Y moving section 132. Although the X fine movement mechanism 12 and the Y fine movement mechanism 13 are explained as two different sections from the point of view of their functions, the two mechanisms are formed in a body by using a common plate-shaped member. A Z fine movement mechanism 14 is placed under the Y fine movement mechanism 13 and fixed to the periphery of the opening 132a of the Y moving section 132. The X, Y and Z fine movement mechanisms 12, 13 and 14 cause their moving sections to move in the X, Y and Z directions respectively in the XYZ coordinates system 500 shown in FIGS. 1 and 2.

Next, each configuration of the X, Y and Z fine movement mechanisms will be explained in detail. In the X fine movement mechanism 12, two fixed sections 120 at both sides are fixed to the supporting member 11 with bolts 124 (or connecting sections such as bonding agent), and an X moving section 122 is arranged at the inside of the fixed sections through parallel-plate type bending sections 121a. The X fine movement mechanism 12 has two pairs of parallel-plate bending sections 121a. The pair of parallel-plate bending sections 121a facing with each other, the fixed section 120, and the X moving section 122 make a space 121b. In each of the two spaces 121b, a piezoelectric actuator 123 for moving the X moving section 122 in the X direction is arranged between a projection 120a of the fixed section 120 and a projection 122a of the X moving section 122.

The Y fine movement mechanism 13 is made by forming long gaps 131c extended in the X direction in the X moving section 122 and has the Y moving section 132 by forming a bending section 131a in the neighborhood of both ends of each of the long gaps 131c. The Y fine movement mechanism 13 has two pairs of parallel-plate type bending sections 131a. The pair of parallel-plate type bending sections 131a, the X moving section 122, and the Y moving section 132 make a space 131b. In each of the two spaces 131b, a piezoelectric actuator 133 for moving the Y moving section 132 in the Y direction is arranged between a projection 122b of the X moving section 122 and a projection 132b of the Y moving section 132. Further, the long gap 131c has a predetermined width necessary for being capable of moving the Y moving section 132 in the Y direction by the desired displacement amount, when the Y direction piezoelectric actuators 133 are actuated to move the Y moving sections 132. The above-mentioned opening 132a is formed in the center of the Y moving section 132.

The Z fine movement mechanism 14 comprises a Z moving section 141 of cylindrical shape and a cylindrical piezoelectric element (piezoelectric actuator) 142 for moving the Z moving section 141 in the Z direction. The cylindrical piezoelectric element 142 is fixed to the Y moving section 132. Since the Z fine movement mechanism 14 is formed to be cylindrical, it has a space directed to the Z direction in its central inside region. Further, a cantilever 17 having a probe tip 16 at its pointed end is fixed to a lower end of the Z moving section 141 through a fixed member 15 and a fitting member 171, and the fine movement due to the Z moving section 141 mentioned below enables the probe tip 16 to measure a sample (not shown in the figures). A member 18 shown in FIG. 1 with imaginary lines is another observation means for observing parts to be measured such as the probe tip 16 and the like, and it is concretely an object lens of an optical microscope and the like, for example.

Next, the operation of the above-mentioned fine movement mechanism unit will be explained with reference to FIG. 3. A reference numeral 100 denotes a controller for controlling the scanning atomic force microscope, for example. The controller 100 executes the entire control required for the measurement based on the microscope. A reference numeral 101 denotes a control circuit for fine movement in the X direction. This X direction fine movement control circuit 101 applies the same voltages to electrodes (not shown in the figures) of two right and left piezoelectric actuators 123 on the basis of commands given from the controller 100 and thereby causes the X moving section 122 to be finely displaced in the X direction by desired expansion and contraction amount. The displacement of the X moving section 122 can be produced by the bending operation of the parallel-plate bending sections 121a connecting the fixed section 120 and the X moving section 122. The bending operation follows the expansion and contraction action of the piezoelectric actuators 123. The Y fine movement mechanism 13 arranged in the X moving section 122, and the Z fine movement mechanism 14 fixed to the Y fine movement mechanism 13 are also displaced in the X direction by the same distance together with the X moving section 122 at the same time.

A reference numeral 102 denotes a control circuit for fine movement in the Y direction. The Y direction fine movement control circuit 102 applies the same voltages to the two piezoelectric actuators 133 on the basis of commands given from the controller 100 and thereby causes the Y moving section 132 to be finely displaced to the desired position in the Y direction relative to the X moving section 122. The displacement in the Y direction can be produced by the bending operation of the parallel-plate bending sections 131a connecting the X moving section 122 and the Y fine movement mechanism 13. The displacement in the Y direction can be permitted on the ground of the long gaps 131c having the predetermined width. The Z fine movement mechanism 14 fixed to the Y moving section 132 is also displaced in the Y direction by the same distance together with the Y moving section 132 at the same time. Thus, the whole of the fine movement mechanism is separated into the X fine movement mechanism and the Y fine movement mechanism, and therefore the fine movements in the X and Y directions can be performed independently. Consequently, the load of the fine movement mechanism operating so as to follow the surface shape of the sample can be reduced and the characteristics of the scanning operation in the X and Y directions (rectangular coordinates system) can be improved.

A reference numeral 103 denotes a control circuit for fine movement in the Z direction. The Z direction fine movement control circuit 103 applies a voltage to the piezoelectric actuator 142 on the basis of commands given from the controller 100 and thereby causes the Z moving section 141 to be finely displaced to the desired position in the Z direction relative to the Y moving section 132. In accordance with this fine movement, the probe tip 16 and the like fixed to the lower section of the Z fine movement mechanism 14, for example, can be displaced in the Z direction.

The configuration of the above-mentioned first embodiment is fit for measuring a large-sized sample and capable of reducing the load of the fine movement mechanism when carrying out the measurement, and enables the independent and exact fine scanning movements in the X and Y directions, and further can improve the movement characteristics in the rectangular coordinates system. Further, since each of the X and Y fine movement mechanisms has the opening and the Z fine movement mechanism is configured to use the cylindrical piezoelectric actuator and the cylindrical Z moving section, the configuration of the first embodiment can ensure the specific space used for arranging another different microscope (an optical microscope or an electron microscope etc.) capable of observing the part to be measured including the cantilever fixed to the lower section of the Z fine movement mechanism, for example.

Figure 4:
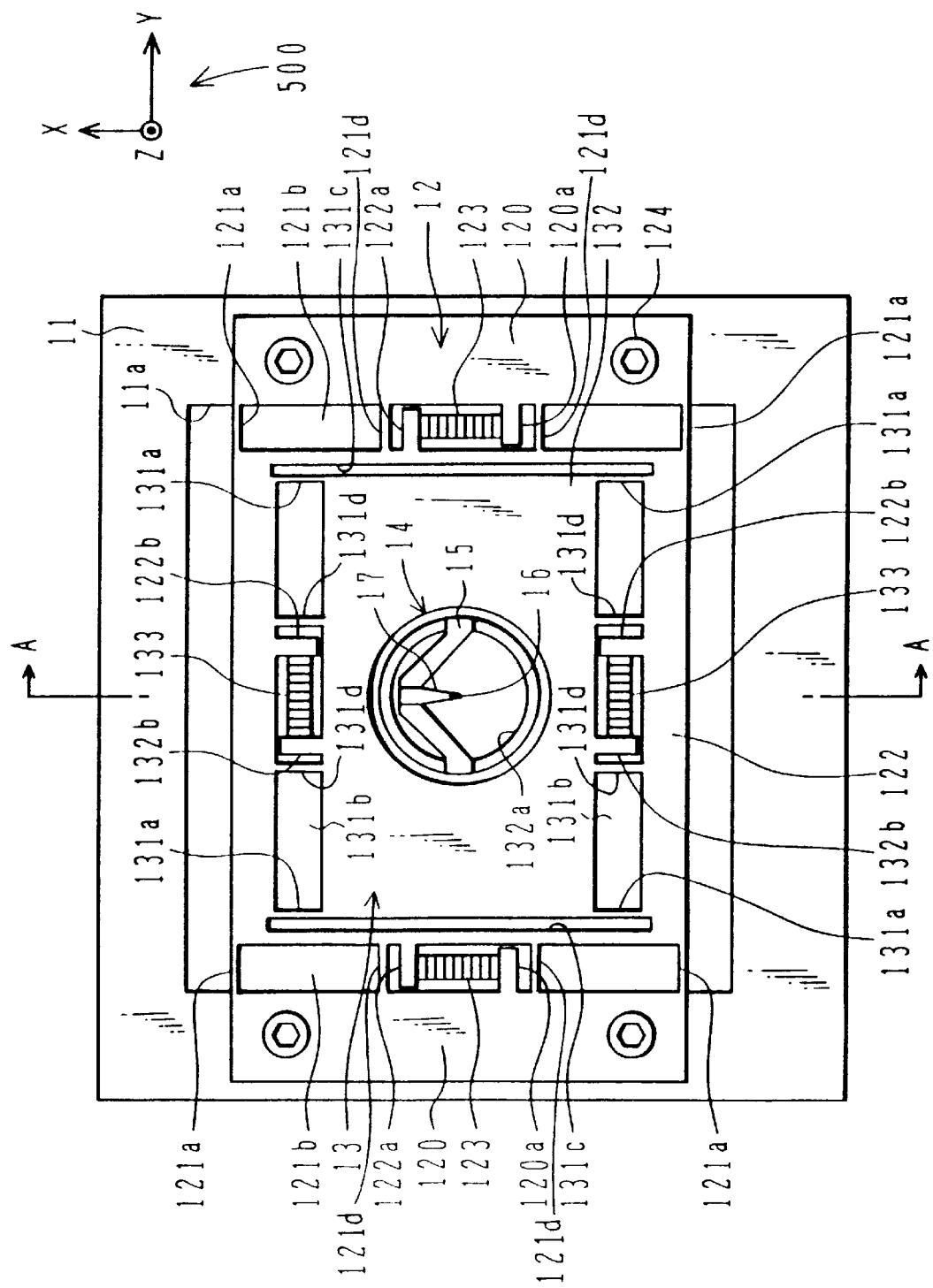
FIG. 4 is a bottom view of a modified example of the fine movement mechanism unit of the first embodiment.

FIG. 4 shows the modified example of the above-mentioned fine movement mechanism unit according to the first embodiment. FIG. 4 is a view obtained by seeing the fine movement mechanism unit from the lower side. The fine movement mechanism unit of the modified example has the configuration of the first embodiment, and further has a pair of parallel-plate bending sections 121d added to the place close to the both sides of each of the two piezoelectric actuators 123 in regard to each of the two pairs of the parallel-plate bending sections 121a, and further has a pair of parallel-plate bending sections 131d added to the place close to the both sides of each of the two piezoelectric actuators 133 in regard to each of the two pairs of the parallel-plate bending sections 131a. The other configurations except for the added components are the same as the configurations explained in FIG. 2 and therefore the same components have the same reference numerals respectively. The fine movement mechanism unit of the present embodiment especially has the advantages of high rigidity and movement accuracy in addition to the above-mentioned meritorious technical effects.

Figure 5:
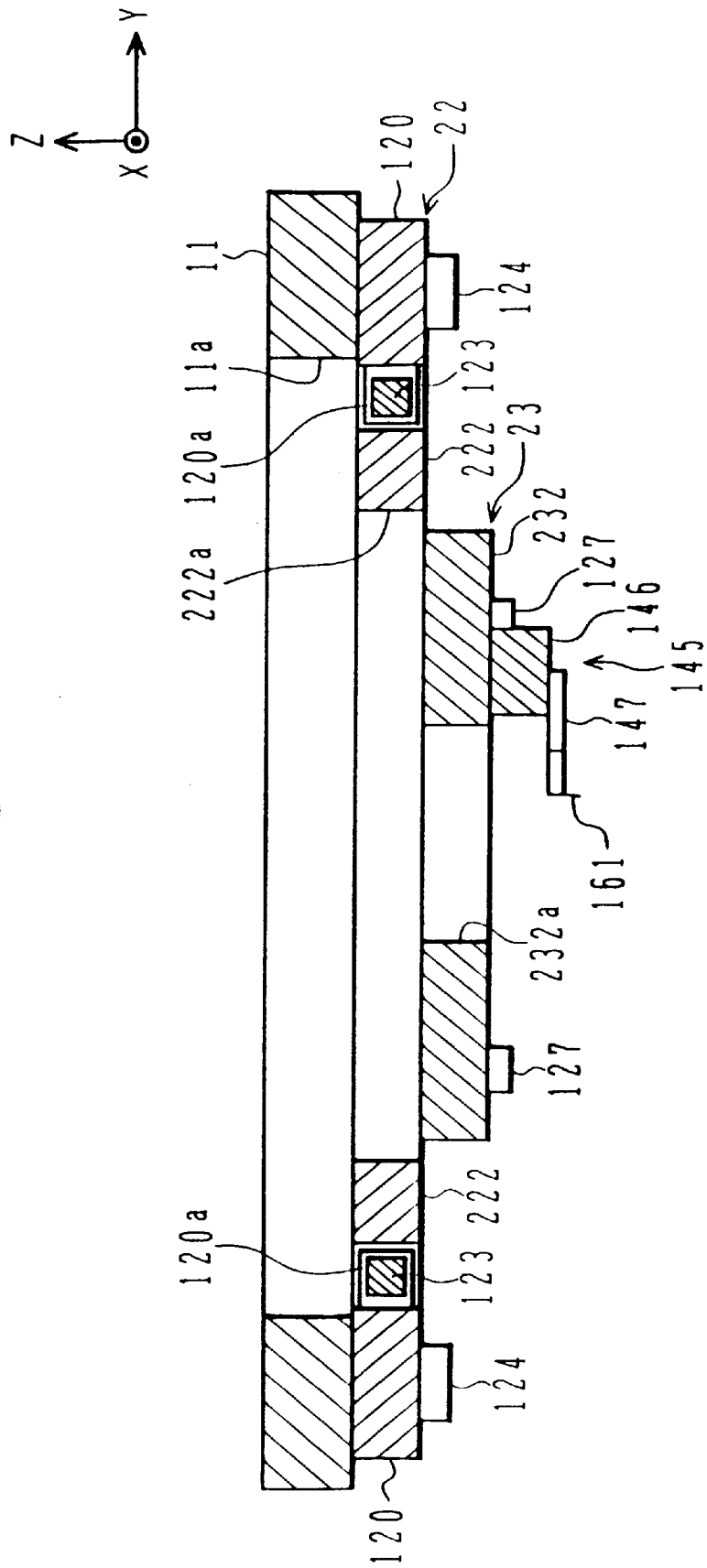
FIG. 5 is a longitudinal sectional view of the second embodiment of the fine movement mechanism unit of the present invention.
Figure 6:
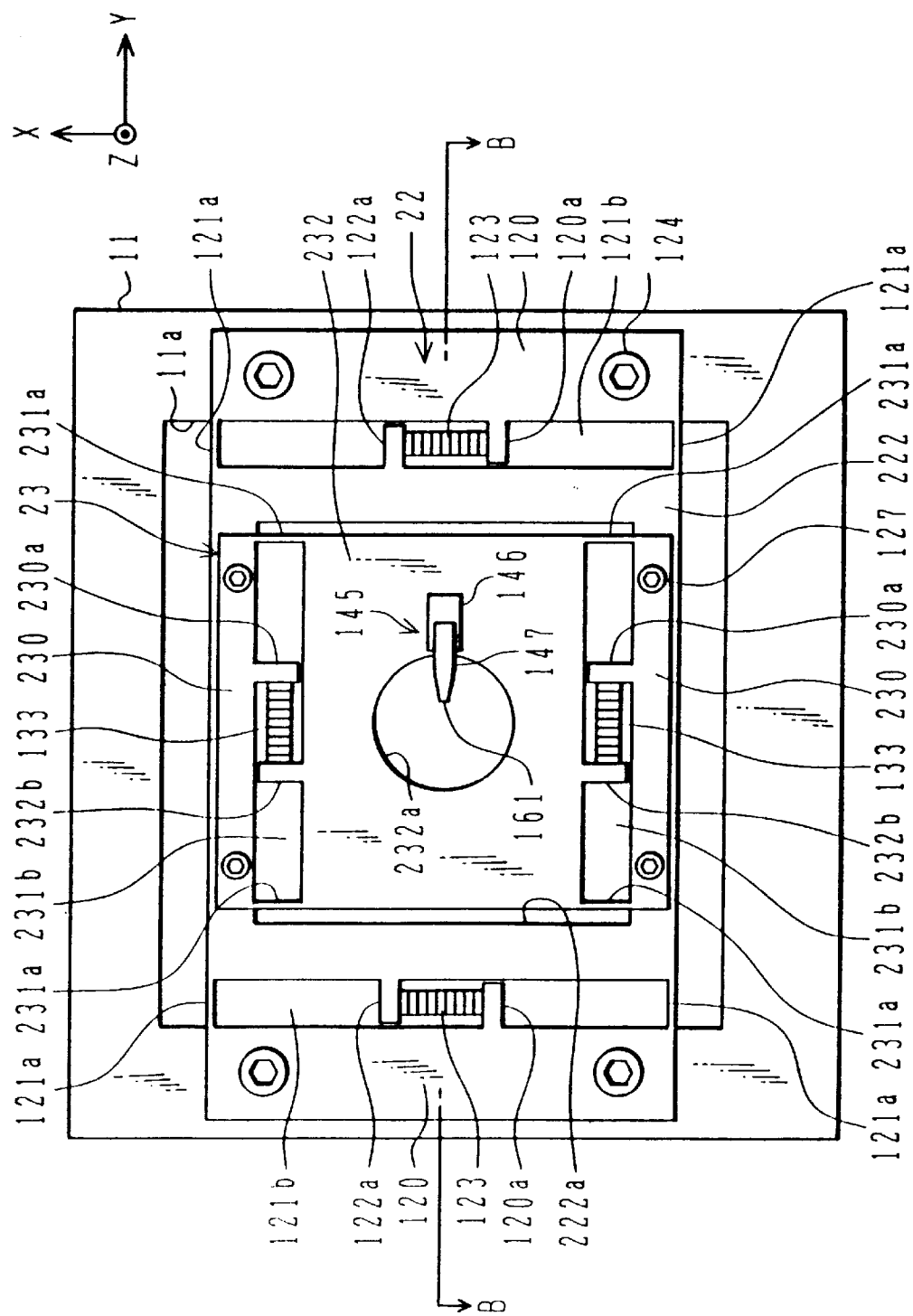
FIG. 6 is a bottom view taken by seeing the fine movement mechanism unit shown in FIG. 5 from a lower side.

Next, the second embodiment of the fine movement mechanism unit will be explained with reference to FIGS. 5 and 6. Components respectively identical to the components shown in FIGS. 1–3 have the same reference numeral and therefore their detailed explanations are omitted. FIG. 5 shows a sectional view (sectional view taken on line B—B in FIG. 6) obtained by cutting the fine movement mechanism unit along the Y direction and FIG. 6 shows a view obtained by seeing the fine movement mechanism unit from lower side in FIG. 5. In this embodiment, the Y fine movement mechanism is formed to be separated from the X fine movement mechanism by using a different plate-shaped member and is fixed to the X moving section, and further the piezoelectric actuator of the Z fine movement mechanism is formed to be a block-shape.

Hereinafter, the configuration of the second embodiment will be explained. The X fine movement mechanism 22 is substantially identical to that of the first embodiment and is formed to be a plate-shaped body, and further has the X moving section 222 in the center thereof. In the X moving section 222, an opening 222a is formed at the part corresponding to the arrangement spot of the Y fine movement mechanism 23.

The Y fine movement mechanism 23 has almost an rectangular shape generally as clarified from the lower side shape shown in FIG. 6. In the Y fine movement mechanism 23, fixed sections 230 fixed to the X moving section 222 are respectively arranged at the both ends, and parallel-plate bending sections 231a are arranged at the inside of these fixed sections 230, and further a Y moving section 232 is provided in the center thereof. The Y fine movement mechanism 23 has two pairs of parallel-plate bending sections 231a. The pair of parallel-plate bending sections 231a, the fixed sections 230, and the Y moving section 232 make a space 231b. In each of the spaces 231b, the piezoelectric actuator 133 for the Y direction movement is arranged between a projection 230a of the fixed section 230 and a projection 232b of the Y moving section 232. Further, the Y moving section 232 has an opening 232a at its almost center. The Y fine movement mechanism 23 is fixed to the X moving section 222 with a plurality of bolts 127, for example.

A Z fine movement mechanism 145 comprises a piezoelectric actuator 146 causing the Z direction movement and a Z moving section 147 attached to the lower end of the actuator 146. The Z fine movement mechanism 145 is fixed to the Y moving section 232. Further, a probe tip 161 used for STM, for example, is arranged at the end of the Z moving section 147.

The fine movement mechanism unit of the second embodiment configured as mentioned above is capable of taking the same effects as the first embodiment. The fine movement mechanism unit of the present invention can be widely applied as the fine movement mechanism performing scanning operation for the scanning probe microscope and the like.

Figure 7:
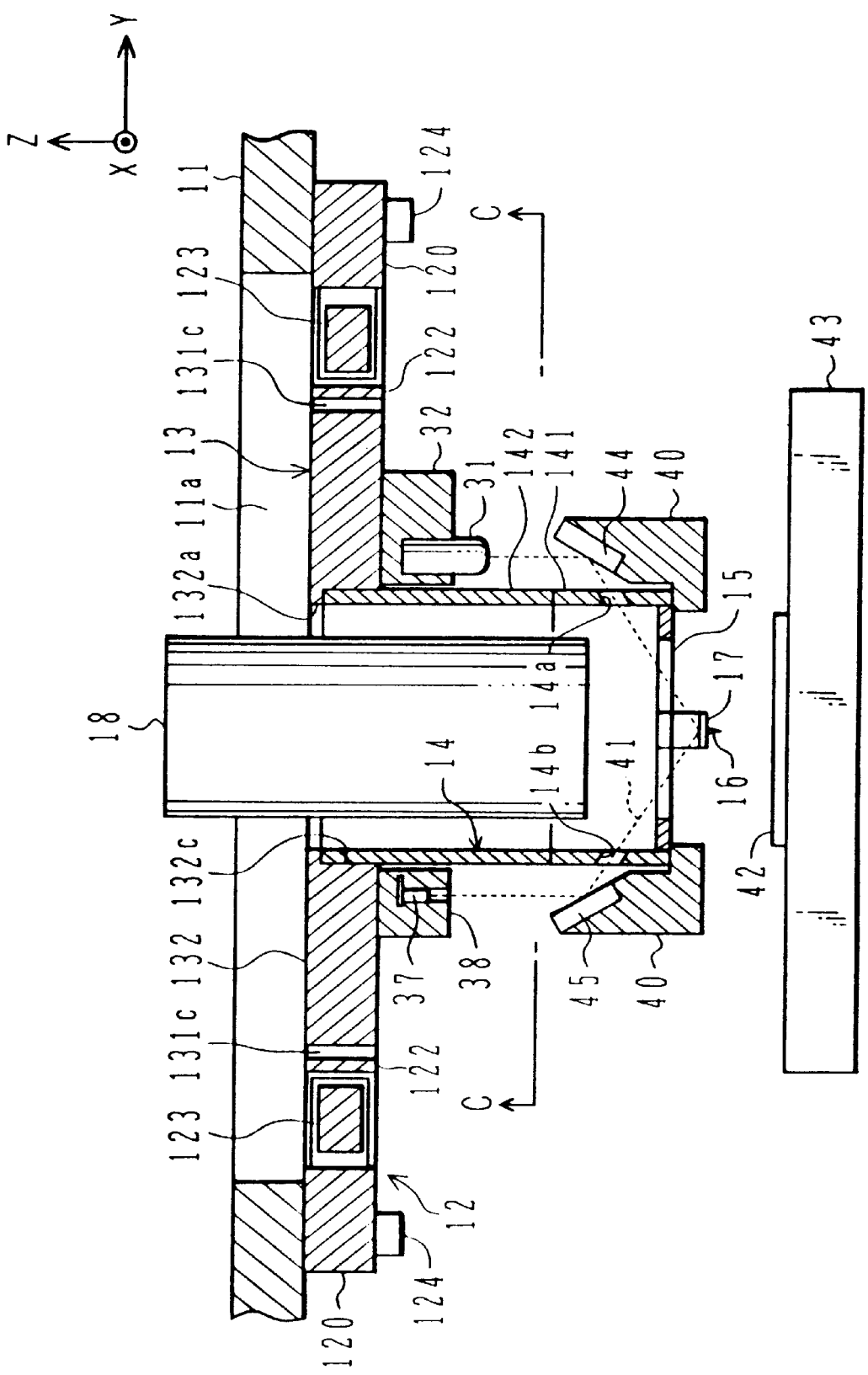
FIG. 7 is a longitudinal sectional view of the first embodiment of the scanning probe microscope of the present invention.
Figure 8:
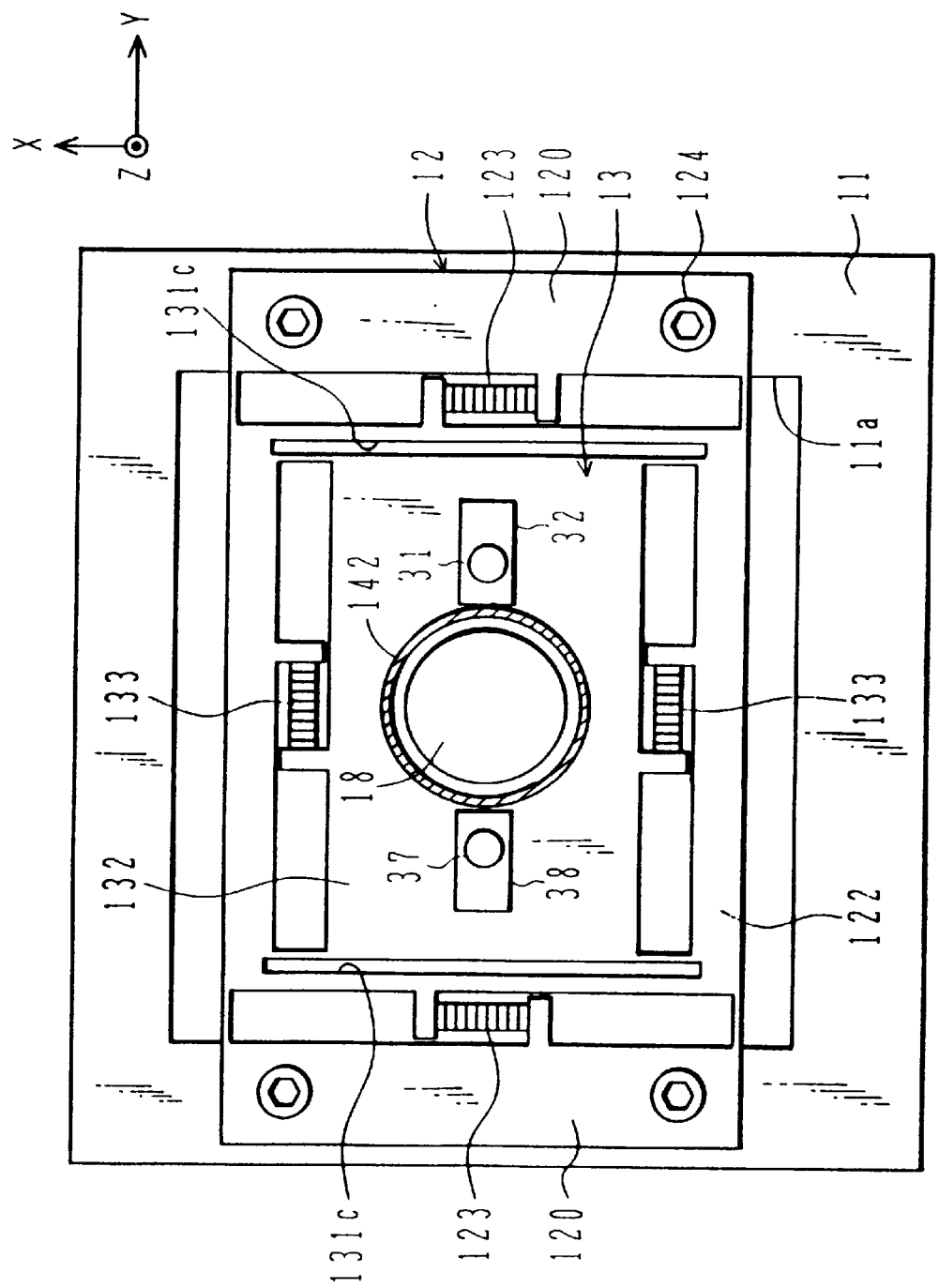
FIG. 8 is an under surface view partly in section taken on line C—C in FIG. 7.
Figure 9:
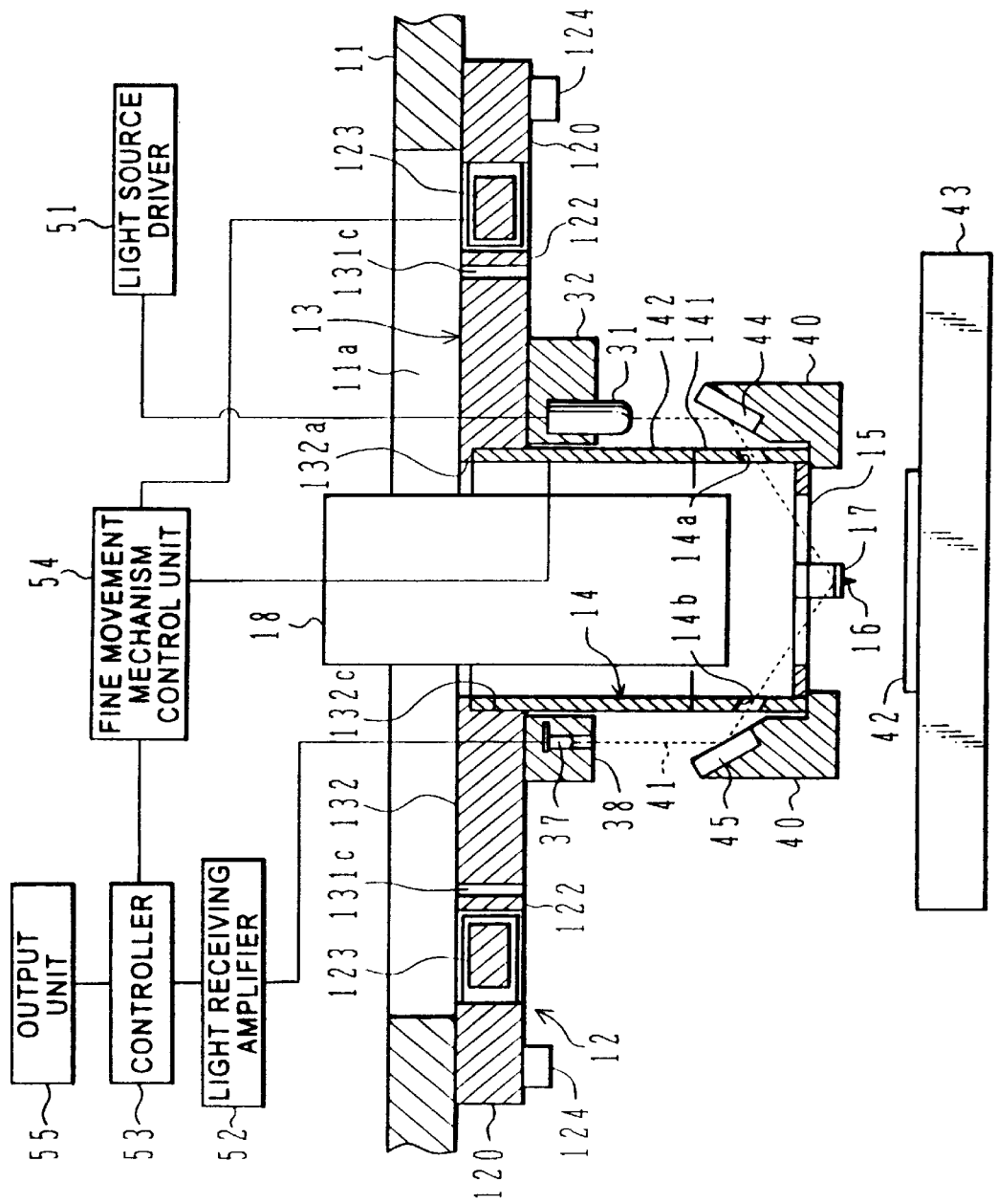
FIG. 9 is a longitudinal sectional view of the first embodiment shown in FIG. 7 with an electric circuit section for an optical detecting system and a control system.

Next, the first embodiment of the scanning probe microscope (SPM) in accordance with the present invention will be explained with reference to FIGS. 7–9. This embodiment shows an example of an atomic force microscope. As a fine movement mechanism, the first embodiment (shown in FIGS. 1–3) of the above-mentioned fine movement mechanism unit is used. FIG. 7 shows a sectional view with partial omission taken on a center line parallel to the Y direction on which the probe tip exists in the scanning probe microscope, and FIG. 8 shows a view taken on line C—C and by seeing the microscope from the lower side in FIG. 7, and FIG. 9 shows the configuration provided with a control system. In the fine movement mechanism unit applied to the SPM of the present invention, components identical to the components explained in the above-mentioned embodiments are respectively affixed with the same reference numerals and therefore their detailed explanations are omitted.

As shown in FIGS. 7–9, the assembly of the X, Y and Z fine movement mechanisms is fixed to the supporting member 11 forming a part of the frame for the scanning probe microscope. The rectangular opening 11a is formed almost at the center of the supporting member 11. The X fine movement mechanism 12 and the Y fine movement mechanism 13 are configured by using the common plate-shaped member and the Y fine movement mechanism 13 is integrated into the X moving section 122 of the X fine movement mechanism 12. The Y moving section 132 has the circular opening 132a and the cylindrical Z-direction piezoelectric actuator 142 of the Z fine movement mechanism 14 is fixed to the lower side of the opening 132a. The piezoelectric actuator 142 is provided with the cylindrical z moving section 141 with a diameter substantially identical to the diameter of the actuator 142. The cantilever 17 with the probe tip 16 is fixed to the lower side of the Z moving section 141 in the Z fine movement mechanism 14 through the fixed member 15. Here, the arrangement position of the probe tip 16 is determined to be almost on the central axis line in the cylindrical piezoelectric actuator 142.

The moving sections of the X, Y and Z fine movement mechanisms are finely moved into the respective directions by applying required voltages to the electrodes (not shown in the figures) of the respective piezoelectric actuators for those fine movement mechanisms. The X and Y directions are respectively equal to scanning directions of the probe tip when causing the probe tip to measure the sample surface, and are substantially parallel to the sample surface. The Z direction corresponds to a movement direction along which the probe tip pointed to the sample surface is approached to the surface or separated from the surface in case of the measurement. In accordance with the above-mentioned configuration, the part positioned in each center of the X and Y fine movement mechanisms can be finely moved in each of the X and Y directions or combined directions. Therefore, the probe tip 16 and the like attached to the lower section of the Z fine movement mechanism 14 is finely moved toward any directions in the XY plane.

Next, configuration of an optical detecting system (or optical detecting unit) for detecting flexural deformation amount (bending amount) of cantilever 17 with the probe tip 16 at its pointed end will be explained. A supporting stand 32 provided with a light source 31 is fixed to the lower surface of the Y moving section 132. The ray of light emitted from the light source 31 is set to be irradiated toward the Z direction. Further, a supporting stand 38 provided with a photodetector 37 is fixed to the lower surface of the Y moving section 132 and the photodetector 37 is set to receive the ray of light coming from the Z direction. The Z moving section 141 is provided with a reflecting-section supporting member 40 with a first reflecting section 44 for guiding the ray of light in the Z direction coming from the light source 31 to strike the rear of the cantilever 17, and another reflecting-section supporting member 40 with a second reflecting section 45 for guiding the ray of light reflected on the rear of the cantilever 17 to the photodetector 37 in the Z direction. Further, the Z moving section 141 has a transparent section 14a such as a hole, a notch, a slit and the like used for passing the ray of light reflected on the first reflecting section 44 to the rear of the cantilever 17 and a transparent section 14b similar to the transparent section 14a for passing the ray of light reflected on the cantilever 17 to the second reflecting section 45. Here, as shown in the figure, the supporting stand 32 with the light source and the supporting stand 38 with the photodetector are mutually arranged on the opposite side of the Z fine movement mechanism 14. The reflecting-section supporting member 40 on the right side having the first reflecting section 44 and the reflecting-section supporting member 40 on the left side having the second reflecting section 45 are also arranged at opposite ends of the fixed member 15 centering around the cantilever 17. Consequently, the light source 31, the first reflecting section 44, the second reflecting section 45, the photodetector 37, and the cantilever 17 with the probe tip 16, which make a measuring section, are arranged on an almost straight line directed to the Y direction in the figure. A light-ray route in the optical detecting system including these components is shown as a dotted line 41 in the FIG. 7.

The above-mentioned cylindrical piezoelectric actuator 142 used for producing the Z direction fine movement has a diameter of about 40 mm, for example. An optical microscope 18 is arranged by utilizing the rectangular opening 11a of the supporting member 11, the circular opening 132a of the Y fine movement mechanism 13 and the inside space of the Z fine movement mechanism 14. The object lens of the optical microscope 18 faces onto the rear of the cantilever 17 and the probe tip 16. Thus, the part to be measured, which includes the probe tip 16 and the like, can be observed with the optical microscope 18. A gap between the optical microscope 18 and the circular opening 132a of the Y fine movement mechanism 13, and a gap between the optical microscope 18 and the Z fine movement mechanism 14 are respectively formed to be wide enough not to get in touch with each other, even if the fine movement is generated in the X or Y direction based on each operation of the X fine movement mechanism 12 and the Y fine movement mechanism 13.

In accordance with the optical detecting system having the above-mentioned configuration, as clarified by the dotted line 41 showing the light-ray route, the ray of light (laser beam etc.) emitted from the light source 31 is irradiated toward the Z direction, and further the reflection on the first reflecting section 44 causes the ray to be irradiated to the rear of the cantilever 17 at a regular angle. Still more, though there is the Z fine movement mechanism 14 in the light-ray route between the first reflecting section 44 and the cantilever 17, as mentioned above, the transparent section 14a through which the ray can pass is formed.

The ray of light reflected on the rear of the cantilever 17 becomes parallel to the Z direction due to next reflection on the second reflecting section 45 and is incident on the photodetector 37. In this light-ray route, similarly, though there is the Z fine movement mechanism 14 between the cantilever 17 and the second reflecting section 45, as mentioned above, the transparent section 14b through which the ray can pass is formed.

The light-ray route shown by the dotted line 41, produced by the structure of the optical detecting system, is stable on its position, and even if the cantilever 17 moves in the XY plane by each of the X and Y fine movement mechanisms 12 and 13 or moves toward the Z direction by the Z fine movement mechanism 14, the optical axis as to the light-ray route can not be shifted.

A sample 42 is placed below the probe tip 16. The sample 42 is mounted on a coarse movement stage 43 as a sample stand. The coarse movement stage 43 enables the movement of relatively long distance in each of the X, Y and Z directions. The sample 42 can be moved to any position by the coarse movement stage 43. The optical microscope 18 arranged above the cantilever 17 enables the observation of the probe tip 16 and the sample 42.

In the above-mentioned configuration, when the coarse movement stage 43 moves the sample 42 toward the Z direction at an arbitrary position on the XY plane so as to approach the probe tip 16, an atomic force is generated between the probe tip 16 and the sample 42 and therefore the cantilever 17 is bent by the atomic force. At this time, the optical axis as to the light-ray route from the cantilever 17 to the photodetector 37 changes and this change of the optical axis is detected by the photodetector 37. According to the photodetector 37 detecting the bending amount of the cantilever 17, the displacement of the Z direction generated in the probe tip 16 can be detected. As for the above-mentioned optical detecting system, even if at the measurement the probe tip can be moved in the XY plane, as long as the bending amount of the cantilever 17 is regular, the ray of light is irradiated to the same spot in the rear of the cantilever 17 and as a result the ray enters the same spot in the photodetector finally.

Next, a control system will be explained with reference to FIG. 9. The light source 31 is driven by a drive signal from a light source driver 51 and thereby emits the ray of light. A signal outputted from the photodetector 37 is inputted into a controller 53 through a light receiving amplifier 52. The controller 53 has the function of controlling the actions in the X and Y directions by means of both the X fine movement mechanism 12 and the Y fine movement mechanism 13 and the action in the Z direction by means of the Z fine movement mechanism 14 through a fine movement mechanism control unit 54. The fine movement mechanism control unit 54 controls the X and Y fine movement mechanisms to move the probe tip 16 toward the X and Y directions. At that time, the cantilever 17 is bent due to the atomic force between the probe tip and the sample. The bending amount of the cantilever 17 is detected by the photodetector 37 and provided to the controller 53. The controller 53 instructs the fine movement mechanism control unit 54 to control the expansion action or the contraction action of the Z fine movement mechanism 14 so that the bending amount of the cantilever 17 can be kept to be constant. This sort of control based on the controller 53 is carried out continuously while the probe tip measures the surface of the sample 42. The data obtained by this measurement, that is, position data (XY data) of the probe tip in the measured surface of the sample and height data (Z data) at respective measured points are stored in the controller 53. The controller 53 produces measurement images by using the data, for example, and outputs the images to an output unit 55.

Figure 10:
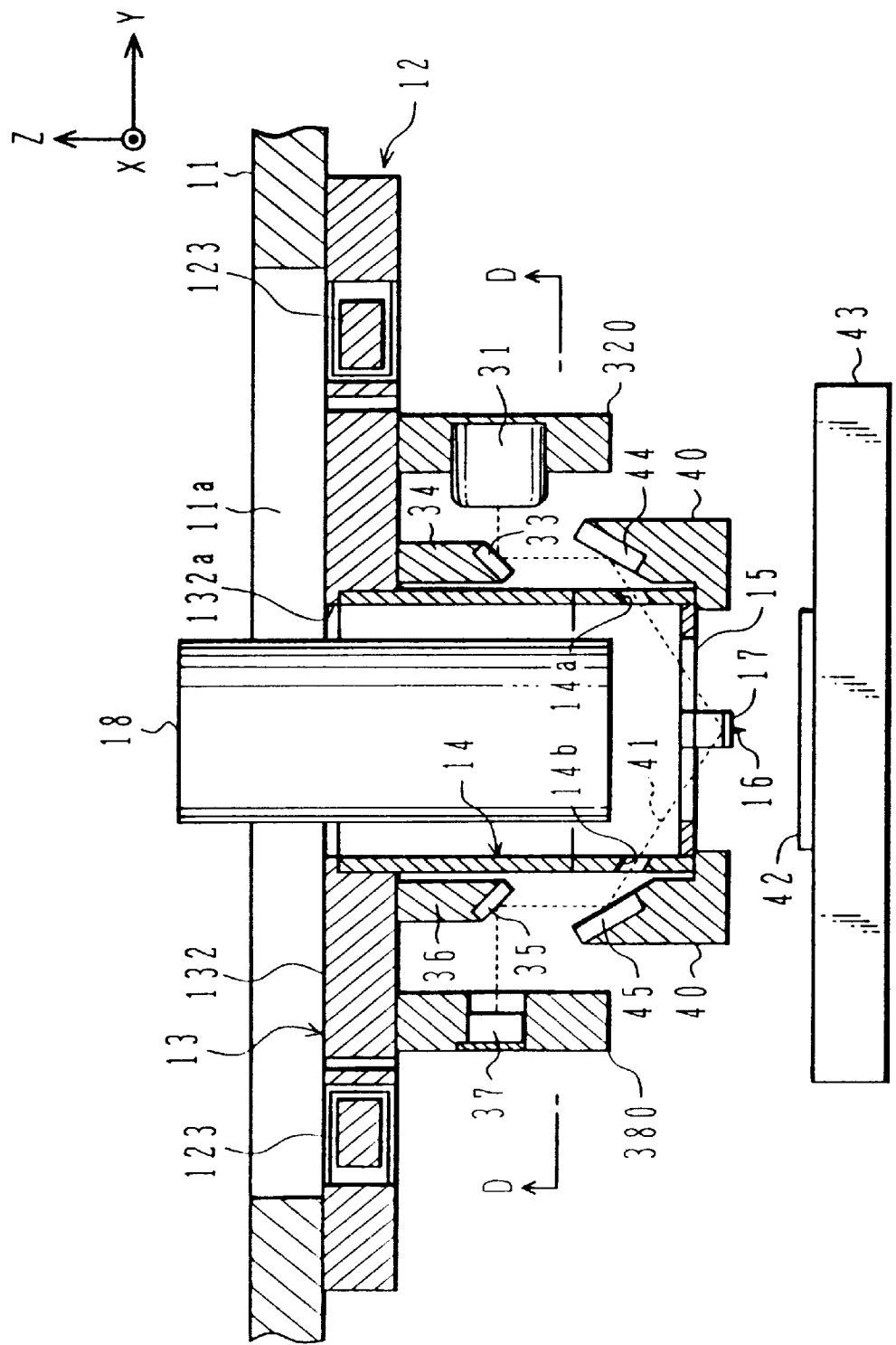
FIG. 10 is a longitudinal sectional view of the second embodiment of the scanning probe microscope of the present invention.
Figure 11:
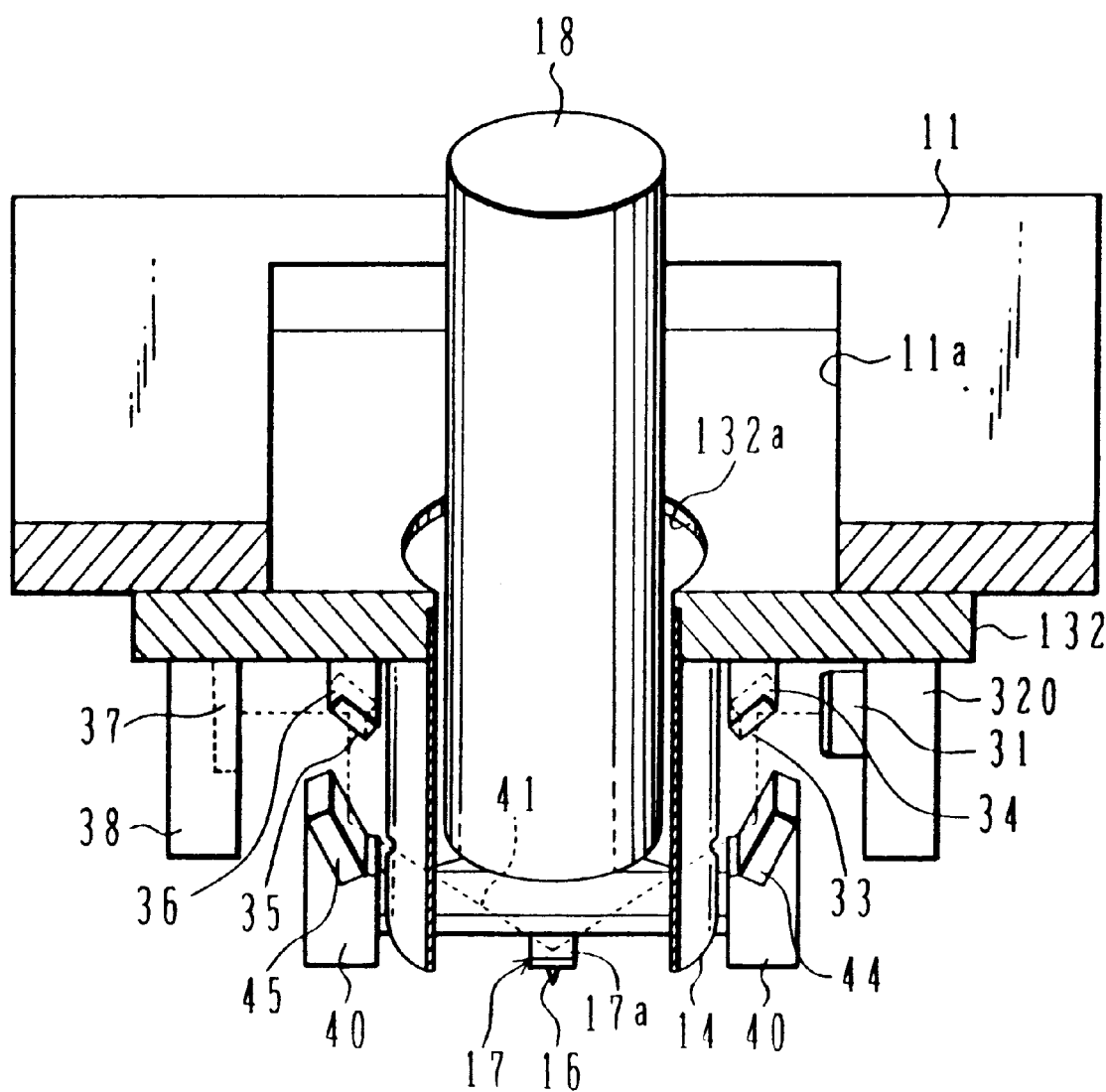
FIG. 11 is a perspective view partly in section showing a main section of the optical detecting system in the second embodiment.
Figure 12:
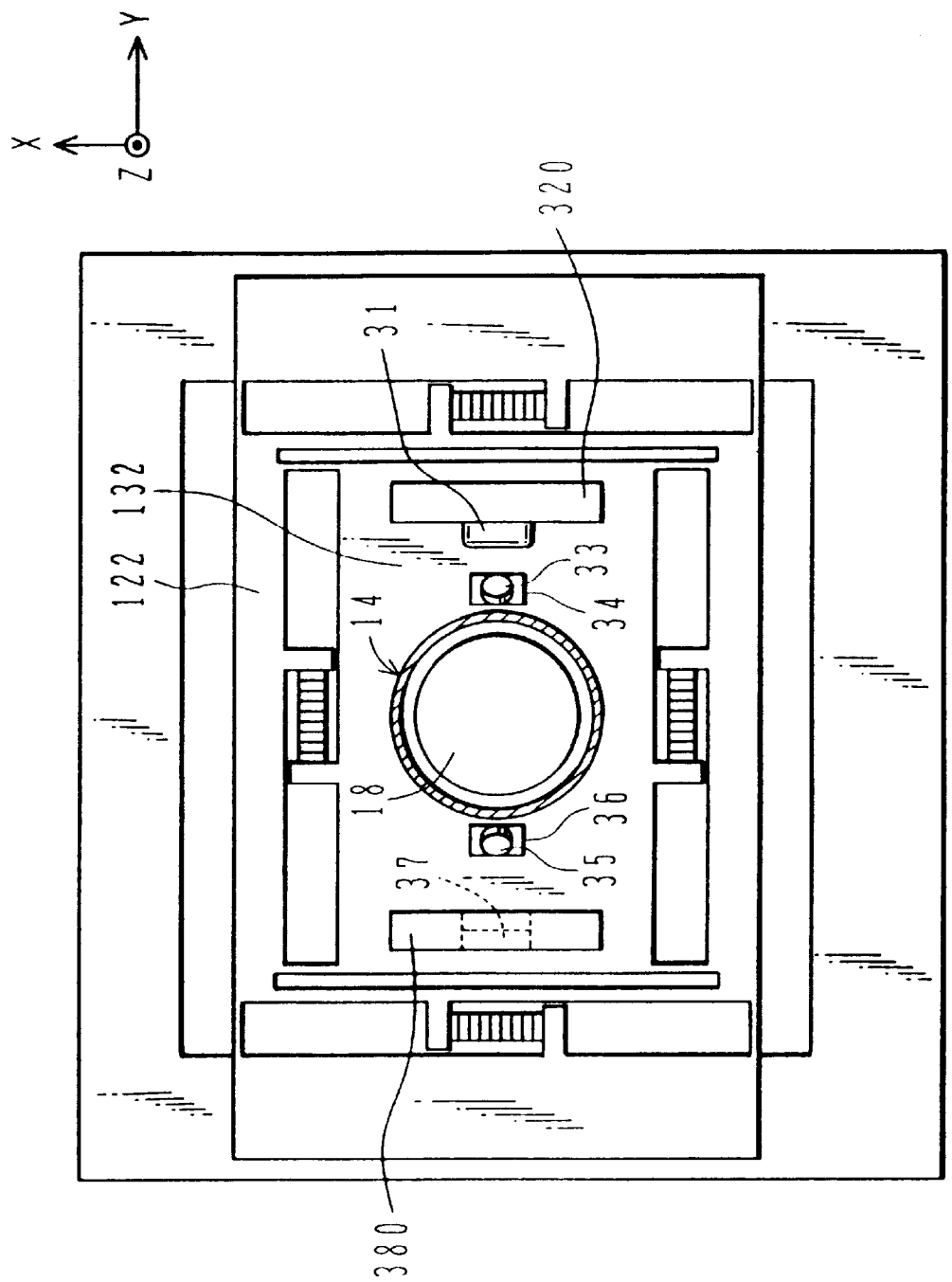
FIG. 12 is an under surface view partly in section taken on line D—D in FIG. 10.

Next, the second embodiment of the scanning probe microscope of the present invention will be explained with reference to FIGS. 10–12. FIG. 10 shows a sectional view taken on a line along the Y direction, and FIG. 11 is a perspective view showing appearance which is cut away partially, and FIG. 12 shows a sectional view with partial omission taken on line D—D and by seeing the microscope from lower side. In this second embodiment, components substantially identical to the components explained in the first embodiment are respectively affixed with the same reference numerals and their detailed explanations are omitted. In the scanning probe microscope of the second embodiment, comparing with that of the first embodiment, the optical detecting system is provided with a third reflecting section 33 between the light source 31 and the first reflecting section 44, and a fourth reflecting section 35 between the second section 45 and the photodetector 37. The third reflecting section 33 and the fourth reflecting section 35 are respectively supported by supporting members 34 and 36, and they are fixed to the bottom surface of the Y moving section 132 of the Y fine movement mechanism 13.

Hereinafter, the configuration as to the parts different from the first embodiment will be explained mainly. A light source supporting member 320 provided with the light source irradiating the ray of light toward the Y direction, and a reflecting section supporting member 34 provided with the third reflecting section 33 reflecting the ray from the light source 31 toward the Z direction to reach the first reflecting section 44 are fixed to the lower surface of the Y moving section 132. Further, similarly, a reflecting section supporting member 36 provided with the fourth reflecting section 35 reflecting the ray in the Z direction coming from the second reflecting section 45 toward the Y direction, and a photodetector supporting member 380 provided with the photodetector 37 receiving the ray of light coming from the fourth reflecting section 35 are fixed to the lower surface of the Y moving section 132. A set of the light source supporting member 320 and the third reflecting section supporting member 34 and a set of the fourth reflecting section supporting member 36 and the photodetector supporting member 380 are placed on opposite side with the Z fine movement mechanism 14 as the central figure. The light source 31, the third reflecting section 33, the first reflecting section 44, a reflecting surface 17a on the rear of the cantilever 17, the second reflecting section 45, the fourth reflecting section 35 and the photodetector 37 are arranged to form almost a line directed to the Y direction. The other configurations in the second embodiment are the same as those of the scanning probe microscope of the first embodiment.

In accordance with the optical detecting system having the above-mentioned configuration, as clarified by the dotted line 41 showing the light-ray route, the ray of light emitted from the light source 31 etc., which is parallel to the Y direction, is irradiated to the reflecting surface 17a on the rear of the cantilever 17 by means of the reflecting sections 33 and 44. The ray of light reflected by the reflecting section 33 becomes parallel to the Z direction. The ray of light reflected by the reflecting section 44 is irradiated to the rear of the cantilever 17 at the regular angle. Further, though there is the part of the Z fine movement mechanism 14 in the light-ray route between the reflecting section 44 and the cantilever 17, as mentioned above, the transparent section 14a is formed in the part to be the route so that the ray of light can pass.

The ray of light reflected on the reflecting surface 17a of the cantilever 17 is further reflected on the reflecting sections 45 and 35 to enter the photodetector 37. The ray of light reflected on the reflecting section 45 becomes parallel to the Z direction and the ray of light reflected on the reflecting section 35 becomes parallel to the Y direction. Also, though there is the part of the Z fine movement mechanism 14 in the light-ray route between the cantilever 17 and the reflecting section 45, as mentioned above, the transparent section 14b is formed in the part to be the route so that the ray of light can pass.

The light-ray route shown by the dotted line 41, produced by the structure of the optical detecting system, is stable on its position, and even if the cantilever 17 moves in the XY plane by each of the X and Y fine movement mechanisms and moves toward the Z direction by the Z fine movement mechanism, the optical axis as to the above-mentioned light-ray route can not be shifted.

According to the above-mentioned optical detecting system, even if at the measurement the probe tip 16 can be moved, as long as the bending amount of the cantilever 17 is regular, the ray of light is irradiated to the same spot in the rear of the cantilever and as a result the ray of light enters the above-mentioned photodetector 37 at the same position.

Figure 13:
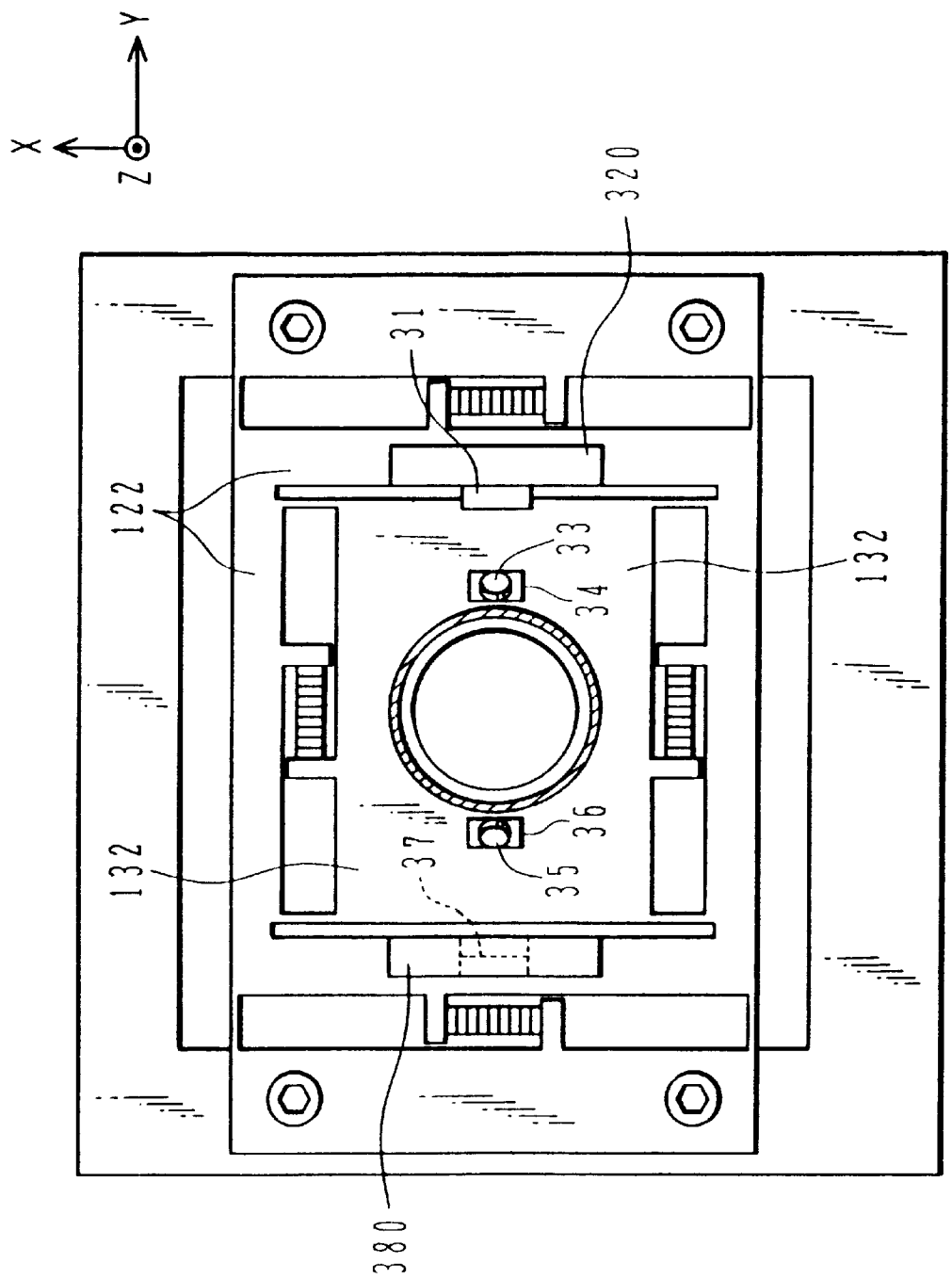
FIG. 13 is an under surface view partly in section showing the third embodiment of the scanning probe microscope of the present invention, corresponding to FIG. 12.

Next, the third embodiment of the scanning probe microscope of the present invention will be explained with reference to FIG. 13. FIG. 13 corresponds to FIG. 12. In the present embodiment, comparing with the second embodiment, the different point is that the light source supporting member 32 with the light source 31 and the photodetector supporting member 380 with the photodetector 37 are not fixed to the Y moving section 132 but the X moving section 122 of the X fine movement mechanism 12. Other configurations are the same as those of the second embodiment.

In the present embodiment, the Y moving section 132 is finely moved together with the X moving section 122 of the X fine movement mechanism 12. For this reason, when the Y moving section 132 moves in the Y direction, the distance between the light source 31 and the third reflecting section 33 and the distance between the fourth reflecting section 35 and the photodetector 37 are changeable respectively, while the optical axis of the Y direction is unchangeable and kept to exist on a straight line in the same way as the above-mentioned embodiment.

Next, the fourth embodiment of the scanning probe microscope of the present invention will be explained with reference to FIGS. 14 and 15. The present embodiment shows a scanning probe microscope configured together with an optical microscope as a set, to which the X, Y and Z fine movement mechanisms and the optical detecting system and the like shown in the second embodiment (FIGS. 10–12) are applied. FIG. 14 shows a partial sectional view taken on a line parallel to the Y direction, and FIG. 15 is a side view with a partial sectional view taken along the Y direction taken by seeing the right side in FIG. 14. In addition, components substantially identical to the components explained in the above-mentioned embodiments have respectively the same reference numerals and their detailed explanations are omitted.

In the figures, a reference numeral 111 denotes a supporting member for the scanning probe microscope and this supporting member 111 is fixed to a supporting base 46. The supporting member 111 is provided with an opening 111a. The X fine movement mechanism 12 explained in the second embodiment is arranged to the supporting member 111 by fixing its fixed sections 120 of both sides to the member 111 with bolts 124. The XYZ coarse movement mechanism 43 is fixed onto the supporting base 46. The XYZ coarse movement mechanism 43 is made to be movable in the X and Y directions respectively with the distance of 250 mm or more, for example, being consistent with a size of the sample 42 to be measured. An optical microscope 49 comprises a frame 47 and the object lens 18. The frame 47 is fixed to the above-mentioned supporting base 46. The object lens 18 is inserted into the opening 111a of the supporting member 111, the opening 132a of the Y moving section 132, and the inside space of the cylindrical Z fine movement mechanism 14, and further arranged to face the measured portion including the probe tip 16.

Figure 3:
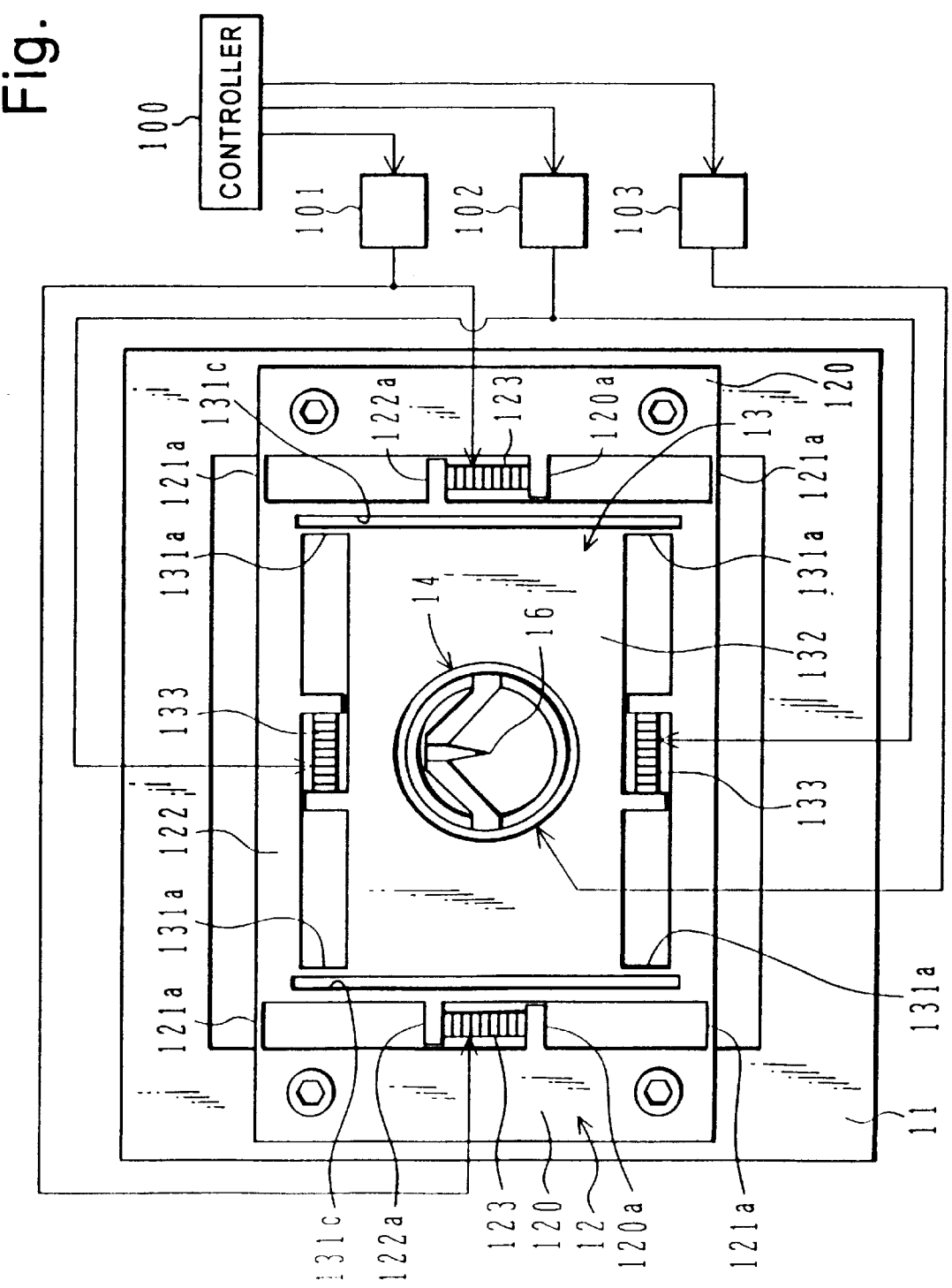
FIG. 3 is a bottom view of the fine movement mechanism unit shown in FIG. 2 with a control system.

By the way, in the fourth embodiment of the scanning probe microscope, the configuration shown in FIGS. 1–3 is used as the X and Y fine movement mechanism unit. However, the fine movement mechanism unit shown in FIG. 4 or in FIGS. 5 and 6 may be applied.

As to all of the above-mentioned scanning probe microscopes, the configuration of the light-ray route and the like in the optical detecting system always keeps the optical axis at the predetermined regular position on the rear of the cantilever 17 even if the cantilever 17 and the probe tip 16 move to any direction of the X, Y and Z directions. Further, in accordance with the configuration of separating the X fine movement mechanism and the Y fine movement mechanism as different mechanisms, the loads applied to the Y fine movement mechanism can be reduced. For example, if the Y direction is set to be a sampling direction in which a sampling action is performed and the X direction is set to be a feeding direction in which a feeding action is performed, a high-speed movement can be carried out in the sampling direction, and further the high-speed movement in the sampling direction gives an important influence on the highly-speeded mo de in the whole measurement. Consequently, to reduce the loads applied to the Y fine movement mechanism can attain the highly-speeded measurement.

Although the examples of the atomic force microscope are explained in each of the above-mentioned embodiments, the optical detecting system of the present invention can be applied to all sorts of the scanning probe microscope with the similar structure including the above-mentioned probe tip and the cantilever. Although the relationship between the X fine movement mechanism and the Y fine movement mechanism is set to integrate the latter into the central section of the former or to attach the latter to the former, this relationship between the two mechanisms can be reversed. In the reversed case, the X fine movement mechanism is integrated into the central section of the Y fine movement mechanism in a body or attached to it as another member, and further the Z fine movement mechanism and the related mechanism is attached to the X fine movement mechanism. In addition, the above-mentioned Z moving section is not necessarily required and in the Z fine movement mechanism the cantilever can be arranged to the piezoelectric actuator directly.

In accordance with the present invention, since the fine movement mechanism unit finely moving the probe tip and the like is separated into three sections which correspond to the X, Y and Z directions respectively and are mutually independent to have no interference among them, the load of the fine movement mechanism finely moving the probe tip and the like at the measurement can be decreased, and the scanning movements in the X and Y directions can be improved, and further large-sized samples can be measured without difficulties.

Also, since the components of the optical detecting system for detecting the flexural deformation amount of the cantilever are positioned by utilizing the side spaces of the upper space above the cantilever, a space used for setting the optical microscope and the like capable of observing the measured portion including the probe tip and the cantilever from the upper side can be ensured. Further, since as to the configuration of detecting the flexural deformation amount of the cantilever by utilizing the optical detecting system the light-ray route (the optical axis) is formed as the predetermined directions by using a plurality of reflecting sections, the ray of light can be always irradiated the predetermined spot on the rear of the cantilever even if the probe tip and the cantilever move any direction of X, Y and Z. Thereby, if the probe tip moves finely toward three-axes directions of X, Y and Z mutually crossing at right angles relative to the sample, a light striking spot on the cantilever and a light entering spot on the light receiving surface of the photodetector can be kept to be regular under the condition that the flexural deformation amount of the cantilever is always the same value.

What is claimed is:

1. A scanning probe microscope comprising:
a supporting member;
a cantilever having a probe tip in its end;
an X fine movement mechanism for moving said cantilever in an X direction in order to perform an X-direction scanning operation, having two fixed sections fixed to said supporting member, at least two pairs of parallel-plate flexural sections disposed between said two fixed sections, an X moving section movable in the X direction, which is connected to each of said two fixed sections through each of said two pairs of parallel-plate flexural sections, and two X direction piezoelectric actuators causing said X moving section to move relatively to said fixed sections, each of which is arranged between two parallel plates in each of said two pairs of parallel-plate flexural sections;

a Y fine movement mechanism for moving said cantilever in a Y direction perpendicular to the X direction in order to perform a Y-direction scanning operation, having other at least two pairs of parallel-plate flexural sections, two parallel plates in each pair of which are arranged in the Y direction perpendicular to the X direction, a Y moving section movable in the Y direction, which is connected to said X moving section through said other two pairs of parallel-plate flexural sections, and two Y direction piezoelectric actuators causing said Y moving section to move relatively to said X moving section, each of which is arranged between the two parallel plates in each of said other two pairs of parallel-plate flexural sections;

a Z fine movement mechanism for approaching or separating said cantilever in a Z direction perpendicular to both of the X and Y directions, having a Z moving section movable in the Z direction perpendicular to both of the X and Y directions, and a Z direction piezoelectric actuator causing said Z moving section to move; and an optical detecting unit for detecting a flexural deformation amount of said cantilever when it bends based on a change of a mutual operative force between said probe tip and a sample;

wherein said cantilever is fixed to a lower side of said Z fine movement mechanism and said probe tip is directed to the sample on a sample stand with a predetermined separation when carrying out measurement, said optical detecting unit includes a light source and a photodetector which are fixed to said Y moving section of said Y fine movement mechanism, and further includes the first reflecting section for reflecting a ray of light emitted from said light source and guiding it to a rear of said cantilever, and the second reflecting section for reflecting the ray of light from the rear of said cantilever to the movement direction of said Z fine movement mechanism so as to send it to said photodetector, wherein said first and second reflecting sections are fixed to said Z fine movement mechanism so that their positional relationship with said cantilever kept to be a predetermined state; and further wherein at the measurement, if the flexural deformation amount of said cantilever is kept to be regular when said probe tip moves, the ray of light is guided to an identical spot on the rear of said cantilever and further to an identical spot on the photodetector.

2. The scanning probe microscope according to claim 1, wherein said optical detecting unit includes the third reflecting section for reflecting the ray of light emitted from said light source in the moving direction of said Y fine movement mechanism toward the moving direction of said Z fine movement mechanism and further guiding it to said first reflecting section, and the fourth reflecting section for reflecting the ray of light from said second reflecting section toward the moving direction of said Y fine movement mechanism to enter said photodetector, wherein said third and fourth reflecting sections are fixed to said Y moving section of said Y fine movement mechanism.

3. The scanning probe microscope according to claim 1, said light source and said photodetector of said optical detecting unit are fixed to said X moving section of said X fine movement mechanism.

4. The scanning probe microscope according to claim 1, wherein said X, Y and Z fine movement mechanisms have openings respectively, which form a space to go through in the Z direction and are used for placing another observation unit from an upper position.

5. The scanning probe microscope according to claim 4, further comprising a supporting base, wherein said supporting member, the sample stand for mounting the sample placed to face said probe tip, a moving stage for moving the sample in each of the X, Y and Z directions, and a supporting frame for supporting said observation unit are fixed to said supporting base, and an object section of said observation unit is placed in the space formed by said openings.

* * * * *